(12) United States Patent
Basra et al.

(10) Patent No.: US 9,107,138 B2
(45) Date of Patent: Aug. 11, 2015

(54) SERVICES DISCOVERY CHANNEL (71) Applicant: Cellco Partnership, Basking Ridge, NJ (US)

(72) Inventors: Arvind Basra, Glen Ridge, NJ (US); John J. Arky, Los Angeles, CA (US)

(73) Assignee: Cellco Partnership, Basking Ridge, NJ (US)

( * ) Notice: Subject to any disclaimer, the term of this patent is extended or adjusted under 35 U.S.C. 154(b) by 179 days.

(21) Appl. No.: 13/866,251

(22) Filed: Apr. 19, 2013

(65) Prior Publication Data

US 2014/0313965 A1   Oct. 23, 2014

(51) Int. Cl.
| | |
|---|---|
| *H04W 4/02* | (2009.01) |
| *H04W 28/06* | (2009.01) |
| *H04W 48/10* | (2009.01) |
| *H04W 76/00* | (2009.01) |
| *H04W 4/06* | (2009.01) |
| H04W 4/00 | (2009.01) |

(52) U.S. Cl.
CPC ............... *H04W 48/10* (2013.01); *H04W 4/06* (2013.01); *H04W 76/002* (2013.01); *H04W 4/001* (2013.01); *H04W 4/023* (2013.01)

(58) Field of Classification Search
CPC ....... H04W 4/06; H04W 4/12; H04W 76/002; H04W 64/00; H04W 68/00; H04W 68/02; H04W 72/005; H04W 72/04; H04N 21/26241; H04N 21/26208; H04N 21/26216; H04N 21/2385; Y02B 60/50

USPC ........ 370/270, 312, 343, 345, 455; 455/412.2
See application file for complete search history.

(56) References Cited

U.S. PATENT DOCUMENTS

| | | | | |
|---|---|---|---|---|
| 2004/0027996 | A1* | 2/2004 | Birdwell et al. | 370/270 |
| 2005/0010957 | A1* | 1/2005 | Muller et al. | 725/95 |
| 2006/0268873 | A1* | 11/2006 | Tonjes et al. | 370/392 |
| 2007/0207727 | A1* | 9/2007 | Song et al. | 455/3.06 |
| 2007/0271589 | A1* | 11/2007 | Yogaratnam et al. | 725/113 |
| 2009/0144771 | A1* | 6/2009 | Bangma et al. | 725/39 |
| 2010/0110965 | A1* | 5/2010 | Kojima | 370/312 |
| 2013/0294318 | A1* | 11/2013 | Amerga et al. | 370/312 |
| 2013/0294321 | A1* | 11/2013 | Wang et al. | 370/312 |
| 2014/0126453 | A1* | 5/2014 | Park et al. | 370/312 |

\* cited by examiner

*Primary Examiner* — Ahmed Elallam (57) ABSTRACT

A system may include one or more devices configured to receive content information associated with a broadcast. The system may determine announcement information based on the content information, where the announcement information may include information that allows a user device to receive the broadcast. The system may determine provisioning information based on the announcement information, where the provisioning information may include information for provisioning a discovery channel, and information specifying a time interval for providing the announcement information via the discovery channel. The system may provision the discovery channel, based on the provisioning information, and may provide the announcement information via the discovery channel based on the specified time interval.

20 Claims, 10 Drawing Sheets

SERVICES DISCOVERY CHANNEL

BACKGROUND

Communication devices, such as cellular telephones, smartphones, computers, or the like, may receive broadcasts of various programs (e.g., sporting events, concerts, movies, etc.). The broadcasts may be transmitted via multimedia broadcast multicast services ("MBMS") to the communications devices.

DETAILED DESCRIPTION OF PREFERRED EMBODIMENTS

The following detailed description of example implementations refers to the accompanying drawings. The same reference numbers in different drawings may identify the same or similar elements.

A user device (e.g., a cellular telephone, a smartphone, a computing device, etc.) may send a query (e.g., via a network) to a content server requesting that the content server provide content (e.g., a picture, a song, a video, etc.) to the user device. If multiple user devices request the same content, the content server may provide multiple copies of the content (e.g., multiple copies of the picture, multiple copies of the song, multiple copies of the video, etc.) to the user devices (e.g., each user device will receive its own copy of the content) via unicast. If the multiple user devices are within a single geographic area (e.g., near a single cellular tower), providing multiple copies of the same content may cause the network to be congested due to content replication, leading to slow information transfer, dropped calls, or the like.

Congestion due to content replication may be eliminated by providing a single copy of the content to the multiple user devices via a broadcast. The multiple user devices may receive the content by tuning in to the broadcast. However, the multiple user devices may need to send queries to the content server requesting announcement information associated with a broadcast (e.g., information identifying the type of content associated with a broadcast, a time for the broadcast, instructions on how to connect to the broadcast, etc.). In instances where the multiple user devices send queries requesting announcement information, the network may still become congested. Implementations described herein may allow user devices to receive announcement information while eliminating network congestion.

Figure 1:
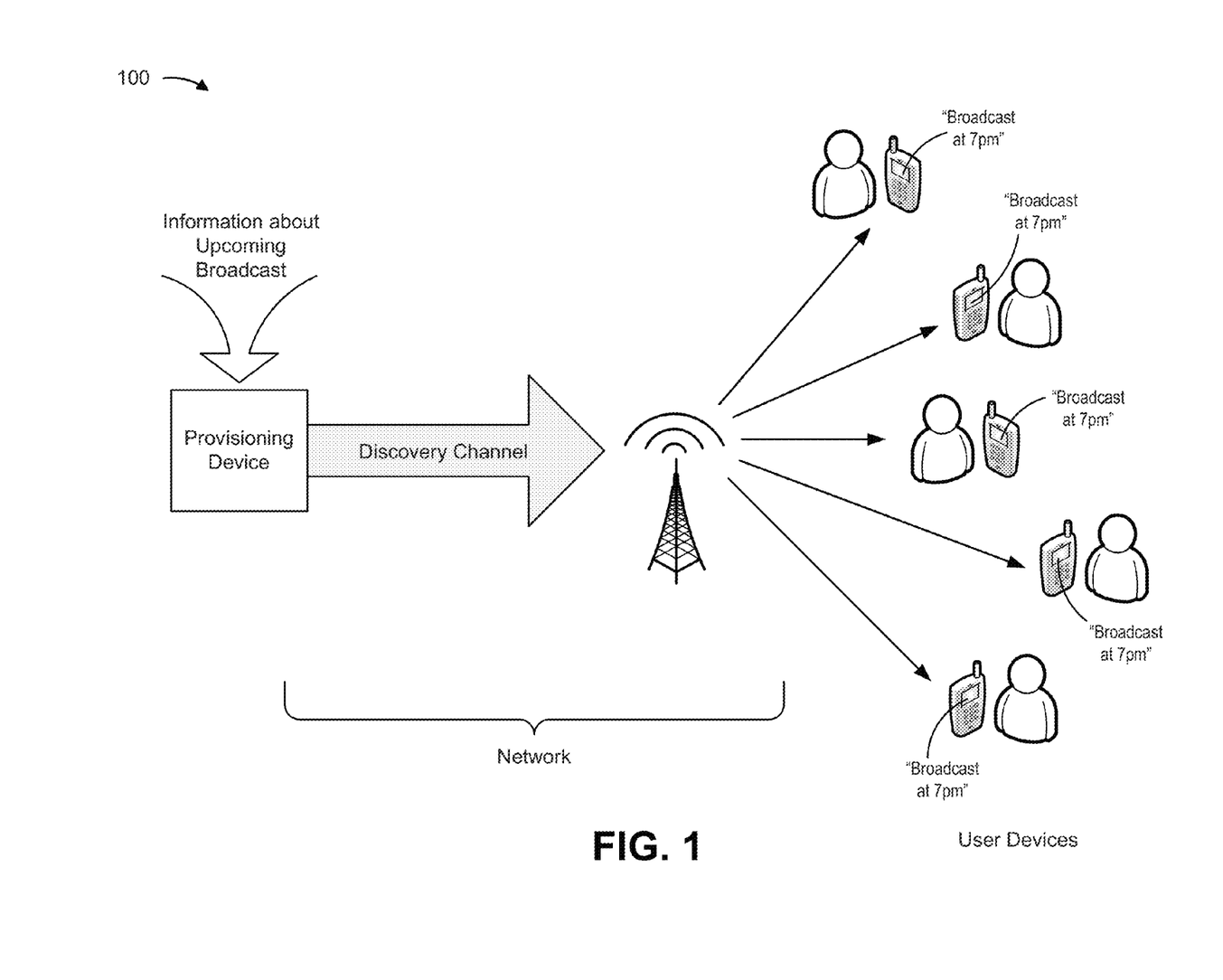
FIG. 1 is a diagram of an overview of an example implementation described herein.

FIG. 1 is a diagram of an overview of an example implementation 100 described herein. As shown in FIG. 1, example implementation 100 may include a provisioning device (e.g., a server), a network, and multiple user devices (e.g., smartphones).

As shown in FIG. 1, the provisioning device may receive information about upcoming broadcasts, such as a broadcast time, a broadcast type, or the like. Based on the information about the upcoming broadcast, the provisioning device may determine announcement information. The announcement information may include information about the broadcast (e.g., the broadcast time, the broadcast type, etc.), as well as information about how to receive the broadcast.

As further shown in FIG. 1, the provisioning device may provision a discovery channel by setting aside a portion of the network bandwidth for the transmission of announcement information. The provisioning device may use the discovery channel to periodically transmit the announcement information. The user devices may tune in to the discovery channel to receive the announcement information. The users of the user devices may be notified of an upcoming broadcast by having a portion of the announcement information (e.g., "Broadcast at 7 pm") provided on displays associated with the user devices. At the time of the broadcast, the user devices may use the announcement information to tune in to (e.g., to watch, to listen, etc.) the broadcast. In this way, the user devices may receive information about upcoming broadcasts without having to request the announcement information from a server via unicast, thus reducing network congestion.

Figure 2:
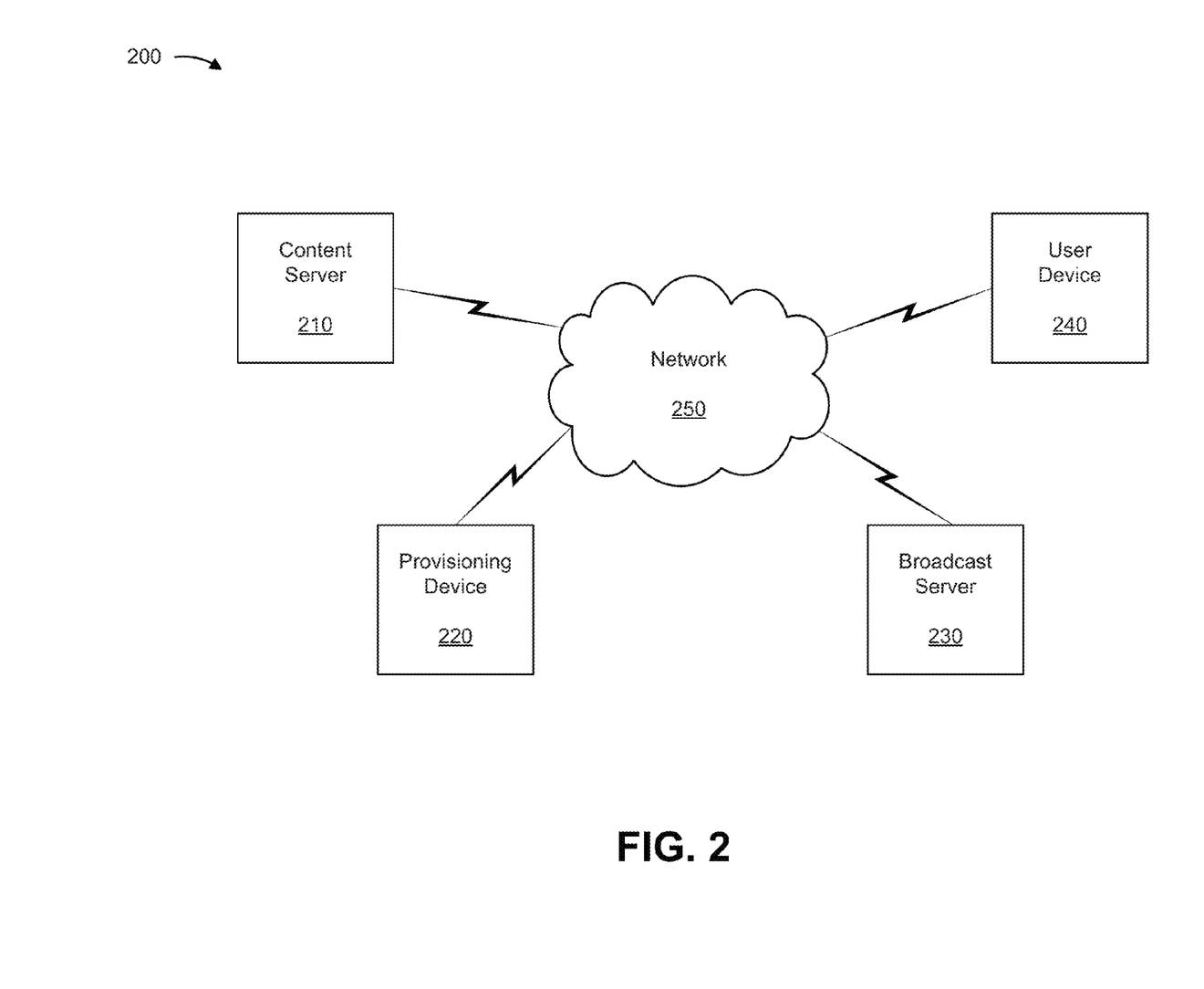
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a content server 210, a provisioning device 220, a broadcast server 230, a user device 240, and a network 250. Devices of environment 200 may interconnect via wired connections, wireless connections, or a combination of wired and wireless connections.

Content server 210 may include a device capable of receiving, processing, storing, and/or providing content, such as content information associated with a broadcast. Content server 210 may include one or more computation or communication devices, such as a server device. In some implementations, content server 210 may include a group of server devices distributed across a network to form a content delivery network ("CDN"). Content server 210 may receive information from and/or transmit information to provisioning device 220, broadcast server 230, and/or user device 240.

Provisioning device 220 may include a device capable of provisioning a network channel. For example, provisioning device 220 may include a computing device (e.g., a server, a desktop computer, a laptop computer, a tablet computer, a handheld computer), a network device (e.g., a gateway, a base station, etc.), or a similar device. In some implementations, provisioning device 220 may include a broadcast video provisioning system ("BVPS"). Provisioning device 220 may receive information from and/or transmit information to content sever 210, broadcast server 230, and/or user device 240.

Broadcast server 230 may include a device capable of receiving, processing, storing, and/or providing information, such as announcement information. Broadcast server 230 may include one or more computation or communication devices, such as a server device. In some implementations, broadcast server 230 may include a broadcast multicast server center ("BM-SC"). Broadcast server 230 may receive information from and/or transmit information to content server 210, provisioning device 230, and/or user device 240.

User device 240 may include a device capable of receiving a broadcast. For example, user device 240 may include a mobile device (e.g., a smartphone, a radiotelephone, etc.), a computing device (e.g., a desktop computer, a laptop computer, a tablet computer, a handheld computer, etc.), or a similar device. User device 240 may receive information from and/or transmit information to content server 210, provisioning device 220, and/or broadcast server 230.

Network 250 may include one or more wired and/or wireless networks. For example, network 250 may include a cellular network (e.g., a long term evolution ("LTE") network, a multicast-broadcast single frequency network ("MBSFN"), etc.), a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
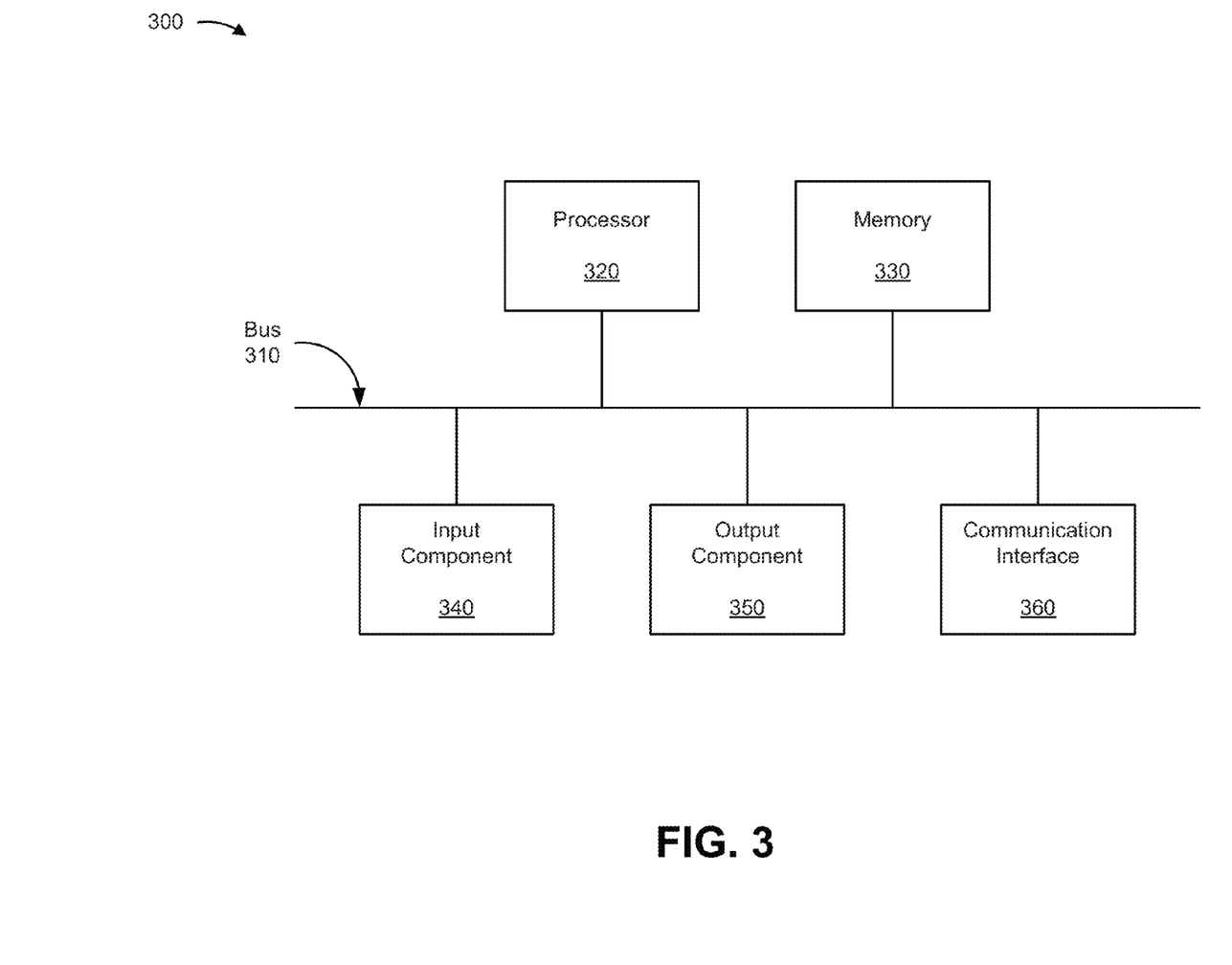
FIG. 3 is a diagram of example components of one or more devices of FIG. 2.

FIG. 3 is a diagram of example components of a device 300. Device 300 may correspond to content server 210, provisioning device 220, broadcast server 230, and/or user device 240. Additionally, or alternatively, each of content server 210, provisioning device 220, broadcast server 230, and/or user device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4A:
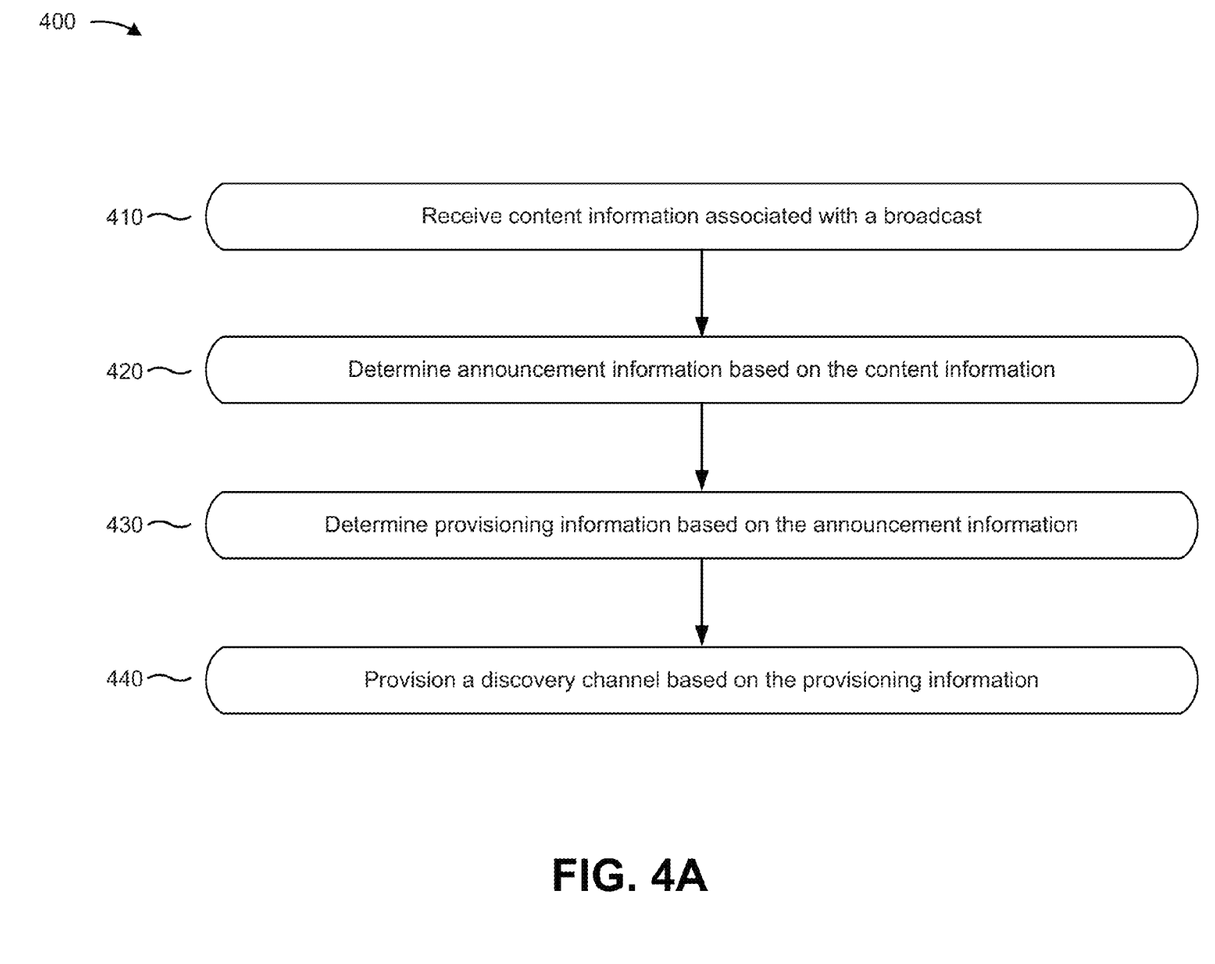
FIGS. 4A and 4B are flow charts of an example process for providing announcement information via a discovery channel.
Figure 4B:
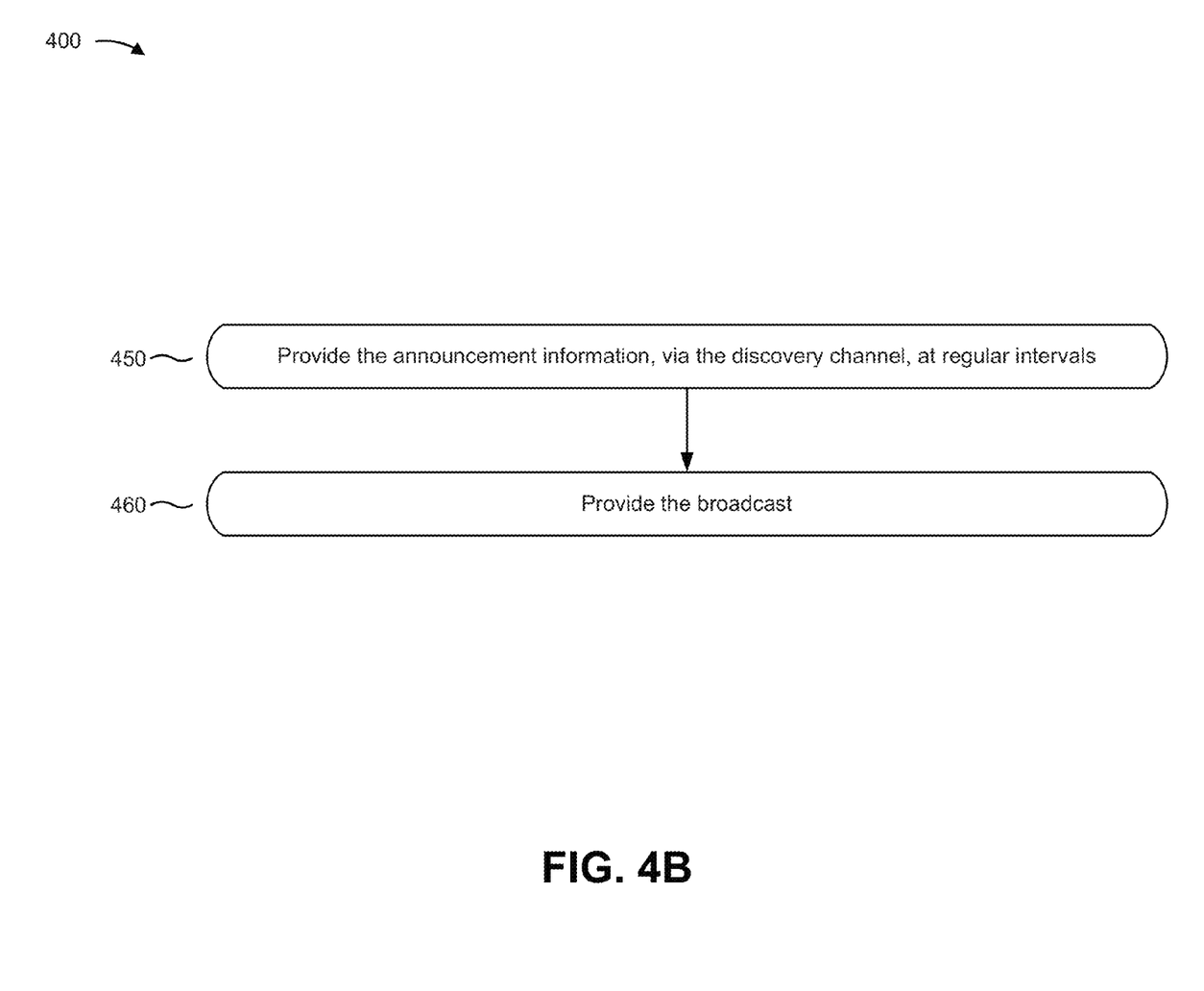

FIGS. 4A and 4B are flow charts of an example process 400 for providing announcement information via a discovery channel. In some implementations, one or more process blocks of FIGS. 4A and 4B may be performed by provisioning device 220. Additionally, or alternatively, one or more process blocks of FIGS. 4A and 4B may be performed by another device or a group of devices separate from or including provisioning device 220, such as content server 210 and/or broadcast server 230.

As shown in FIG. 4A, process 400 may include receiving content information associated with a broadcast (block 410). For example, provisioning device 220 may receive content information from content server 210. In some implementations, the content information may be associated with a broadcast, such as a broadcast scheduled for a future time. The broadcast may include a video communication (e.g., a movie, a television show, a commercial, etc.), an audio communication (e.g., a song, a radio program, a concert, etc.), a textual communication (e.g., a document, a short message service (SMS) text message, etc.), or the like. In some implementations, the broadcast may correspond to a live event (e.g., a live broadcast). Alternatively, the broadcast may correspond to a recorded event.

In some implementations, the content information may include information that is associated with the broadcast. For example, the content information may include information that identifies a broadcast date, a broadcast time, a broadcast subject (e.g., a sporting event, a debate, a television show, etc.), a broadcast location (e.g., a location associated with a subject of the broadcast), a broadcast description (e.g., a description of places, people, and/or objects associated with the broadcast), a broadcast duration (e.g., an expected amount of time for the broadcast), or the like. In some implementations, the content information may include information that identifies an intended group of recipients (e.g., a class, an audience, a demographic, users in a particular geographic region, etc.). For example, the content information my include an indication that a broadcast (e.g., a video recording of a sporting event) is intended for a particular group of recipients (e.g., sports fans, subscribers to a particular sports service, residents of a particular region, etc.).

As further shown in FIG. 4A, process 400 may include determining announcement information based on the content information (block 420). For example, provisioning device 220 may determine the announcement information based on the content information received from content server 210.

In some implementations, the announcement information may include information that allows another device (e.g., user device 240) to receive the broadcast. For example, the announcement information may include information identifying a broadcast date, a start and/or stop time of a broadcast, a broadcast type, a geographic location associated with the broadcast (e.g., a location associated with the source of the broadcast, a location in which the broadcast will be available, etc.), or the like. Additionally, or alternatively, the announcement information may include an identifier that identifies a broadcast source (e.g., a computer, a server, a gateway, etc.) associated with the broadcast (e.g., content server 210, provisioning device 220, broadcast server 230, etc.) identified in the content information. In some implementations, the identifier may include an internet protocol ("IP") address, an IP multicast address, a multicast service identifier, a temporary mobile group identity ("TMGI"), or the like.

In some implementations, the announcement information may include information about how to initialize a session (e.g., to receive the broadcast identified in the content information). For example, the announcement information may identify a protocol (e.g., a session description protocol ("SDP"), session initiation protocol ("SIP"), user datagram protocol ("UDP"), or the like) for exchanging information between communication devices (e.g., between broadcast server 230 and user device 240). Additionally, or alternatively, the announcement information may include information enabling user device 240 to stream the broadcast identified in the content information. For example, the announcement information may include information enabling user device 240 to stream the broadcast via a hypertext transfer protocol ("HTTP") media streaming protocol, such as dynamic adaptive streaming over HTTP ("DASH"), Microsoft smooth streaming, Adobe dynamic streaming, or the like. In some implementations, the announcement information may include a DASH manifest file (e.g., a file including information for viewing the broadcast via DASH).

In some implementations, provisioning device 220 may store the announcement information (e.g., in a data structure associated with provisioning device 220). Additionally, or alternatively, provisioning device 220 may provide the announcement information to another device, such as content server 210, broadcast server 230, and/or user device 240.

As further shown in FIG. 4A, process 400 may include determining provisioning information based on the announcement information (block 430). For example, provisioning device 220 may determine the announcement information, and may determine the provisioning information based on the announcement information. Additionally, or alternatively, provisioning device 220 may determine the provisioning information based on the content information received from content server 210.

In some implementations, the provisioning information may include one or more parameters for provisioning a discovery channel. The discovery channel may include a portion of network bandwidth reserved for transmitting announcement information. For example, the provisioning information may identify an amount (e.g., a minimum amount, a maximum amount, a range, etc.) of bandwidth on the discovery channel necessary for providing the announcement information (e.g., an amount of bandwidth sufficient to deliver an announcement file to user devices 240). Additionally, or alternatively, the provisioning information may identify an interval and/or frequency at which announcement information is to be sent via the discovery channel. In some implementations, the interval may be based on an amount of announcement information, a bandwidth of the discovery channel, a broadcast type, a geographic region to which the announcement information will be sent, etc.

In some implementations, the provisioning information may include a start and/or end time associated with the discovery channel (e.g., when broadcast server 230 is to establish and/or terminate the discovery channel). For example, the announcement information may specify a start and/or end time associated with the broadcast. Based on the start and/or end time of the broadcast, provisioning device 220 may determine the start and/or end time of the discovery channel (e.g., may determine that the discovery channel shall start two weeks prior to the broadcast and/or end five minutes prior to the broadcast).

In some implementations, the provisioning information may include information identifying a location (e.g., a city, a region, a time zone, a portion of a service provider network, etc.) to which the discovery channel is to be available. Additionally, or alternatively, the provisioning information may identify a quantity of discovery channels to be provisioned (e.g., whether to provision a single discovery channel or multiple discovery channels).

In some implementations, provisioning device 220 may configure/provision the discovery channel for delivery of the announcement information. For example, provisioning device 220 may determine a download time (e.g., a threshold maximum quantity of time for which user device 240 is to spend downloading the announcement information from the discovery channel). In some implementations, the download time may be based on an average download time (e.g., an average download time for a given amount of user devices 240, an average download time for a given network 250, etc.).

In some implementations, provisioning device 220 may determine an amount of bandwidth to be provisioned for the discovery channel (e.g., an amount of bandwidth necessary to ensure that user device 240 may download the announcement information within the download time) based on the download time and the amount of announcement information (e.g., a size of an announcement file). For example, provisioning device 220 may determine a first announcement file size (e.g., 10 kilobytes) associated with first announcement information, and a download time (e.g., 4 seconds). Provisioning device 220 may provision the discovery channel with a sufficient amount of bandwidth to ensure that user device 240 may download the first announcement file within the download time (e.g., 4 seconds). Provisioning device 220 may determine a second announcement file size (e.g., 100 kilobytes) associated with second announcement information. Provision device 220 may increase the bandwidth of the discovery channel to ensure that user device 240 may download the second announcement file within the same amount of download time (e.g., 4 seconds). In this manner, provisioning device 220 may vary the bandwidth of the discovery channel based on the amount of announcement information to ensure that the amount of time necessary to download the announcement information remains constant.

In some implementations, provisioning device 220 may determine the provisioning information based on user input. For example, provisioning device 220 may receive input from a user (e.g., a user of provisioning device 220) specifying provisioning parameters (e.g., a bandwidth, a location, etc.). In some implementations, the user may be associated with an operations center, such as a network operations center ("NOC").

In some implementations, provisioning device 220 may store the provisioning information (e.g., in a data structure associated with provisioning device 220). Additionally, or alternatively, provisioning device 220 may send the provisioning information to another device, such as content server 210 and/or broadcast server 230.

As further shown in FIG. 4A, process 400 may include provisioning a discovery channel based on the provisioning information (block 440). For example, provisioning device 220 may provision the discovery channel based on parameters (e.g., a bandwidth, a location, etc.) specified in the provisioning information. The discovery channel may include a portion of a network (e.g., a band of electromagnetic frequencies in a cellular network, an amount of reserved bandwidth, etc.) reserved for transmitting announcement information.

In some implementations, provisioning the discovery channel may include reserving bandwidth for transmission of the announcement information. Bandwidth may include a portion of network 250 available for transmitting information. For example, bandwidth may include a measure of the number of bits processed per unit of time (e.g., a bit-rate, an information rate, etc.). Additionally, or alternatively, bandwidth may include a difference between a lower frequency and an upper frequency in a continuous set of frequencies.

In some implementations, provisioning the discovery channel may include initially establishing the channel. Additionally, or alternatively, provisioning the discovery channel may include adjusting the discovery channel (e.g., changing the bandwidth associated with the discovery channel, changing the geographic location of the discovery channel, etc.).

In some implementations, the discovery channel may include a channel configured for the transmission of textual information (e.g., such as a low bandwidth channel). Additionally, or alternatively, the discovery channel may include a channel in a separate band (e.g., a separate portion of the cellular network spectrum) from a band that transmits voice information (e.g., an out-of-band channel).

In some implementations, the discovery channel may provide announcement information in a periodic cycle (e.g., in a data carousel). For example, provisioning device 220 may provision the discovery channel to repeatedly transmit announcement information to one or more receivers (e.g., one or more user devices 240). The discovery channel may transmit the announcement information at an interval and/or frequency specified by the provisioning information (e.g., according to interval and/or frequency parameters defined in the provisioning information).

In some implementations, provisioning device 220 may provision the discovery channel for a geographic region in which a broadcast is scheduled. Additionally, or alternatively, provisioning device 220 may provision the discovery channel for a geographic region larger than the geographic region in which the broadcast is scheduled (e.g., an entire city, an entire state, an entire network, etc.).

As shown in FIG. 4B, process 400 may include providing the announcement information, via the discovery channel, at regular intervals (block 450). For example, broadcast server 230 may receive the announcement information from provisioning device 220, and may provide the announcement information, via the discovery channel, at regular intervals.

In some implementations, broadcast server 230 may receive the announcement information from provisioning device 220. Additionally, or alternatively, broadcast server 230 may receive the announcement from another device or a group of devices, such as content server 210, a content delivery network, or the like. For example, provisioning device 220 may publish the announcement information to content server 210. Broadcast server 230 may pull the announcement information from content server 210 and provide the announcement information via the discovery channel.

In some implementations, broadcast server 230 may provide the announcement information at regular intervals based on the provisioning information. For example, broadcast server 230 may receive provisioning information (e.g., from provisioning device 220) that specifies an interval (e.g., two seconds) for providing the announcement information. Based on the interval specified in the provisioning information, broadcast server 230 may repeatedly provide the announcement information (e.g., provide the announcement information every two seconds). In some implementations, the interval may be constant (e.g., broadcast server 230 may provide the announcement information at a constant interval). Additionally, or alternatively, the interval may change with time (e.g., the interval may decrease, the interval may increase, etc.).

In some implementations, the announcement information may include a file (e.g., a text file), and broadcast server 230 may provide the announcement information by sending the file via the discovery channel. In some implementations, broadcast server 230 may periodically receive the same announcement information (e.g., receive the same file) from content server 210 and/or provisioning device 220, and may provide the announcement information via the discovery channel. Additionally, or alternatively, broadcast server 230 may receive updated announcement information (e.g., a file including additional announcement information) from content server 210 and/or provisioning device 220, and may provide the updated announcement information via the discovery channel.

In some implementations, the announcement information may include an image, a video, an audio sound (e.g., an audible alert, an audio recording, etc.), or the like. For example, broadcast server 230 may receive the announcement information (e.g., the image, the video, the audio sound, etc.) from content server 210, and may provide the announcement information via the discovery channel.

In some implementations, broadcast server 230 may use a technique for controlling errors in the transmission of the announcement information. For example, broadcast server 230 may use forward error correction ("FEC") to ensure that user device 240 receives the announcement information.

As further shown in FIG. 4B, process 400 may include providing the broadcast (block 460). For example, broadcast server 230 may provide the broadcast to user device 240. In some implementations, broadcast server 230 may receive the broadcast from content server 210. Additionally, or alternatively, broadcast server 230 may receive the broadcast from provisioning device 220.

In some implementations, broadcast server 230 may provide the broadcast via an enhanced multimedia broadcast multicast services ("eMBMS") network. For example, broadcast server 230 may provide the broadcast using file delivery over unidirectional transport ("FLUTE"). In some implementations, broadcast server 230 may provide the broadcast to one or more geographic regions based on the provisioning information. For example, broadcast server 230 may receive provisioning information indicating that the broadcast is to be transmitted to a particular geographic region (e.g., a venue, a state, a media market, etc.). Based on the provisioning information, broadcast server 230 may provide the broadcast to the particular geographic region (e.g., user devices 240 associated with the particular geographic region).

While a series of blocks has been described with regard to FIGS. 4A and 4B, the blocks and/or the order of the blocks may be modified in some implementations. Additionally, or alternatively, non-dependent blocks may be performed in parallel. Further, one or more blocks may be omitted.

Figure 5A:
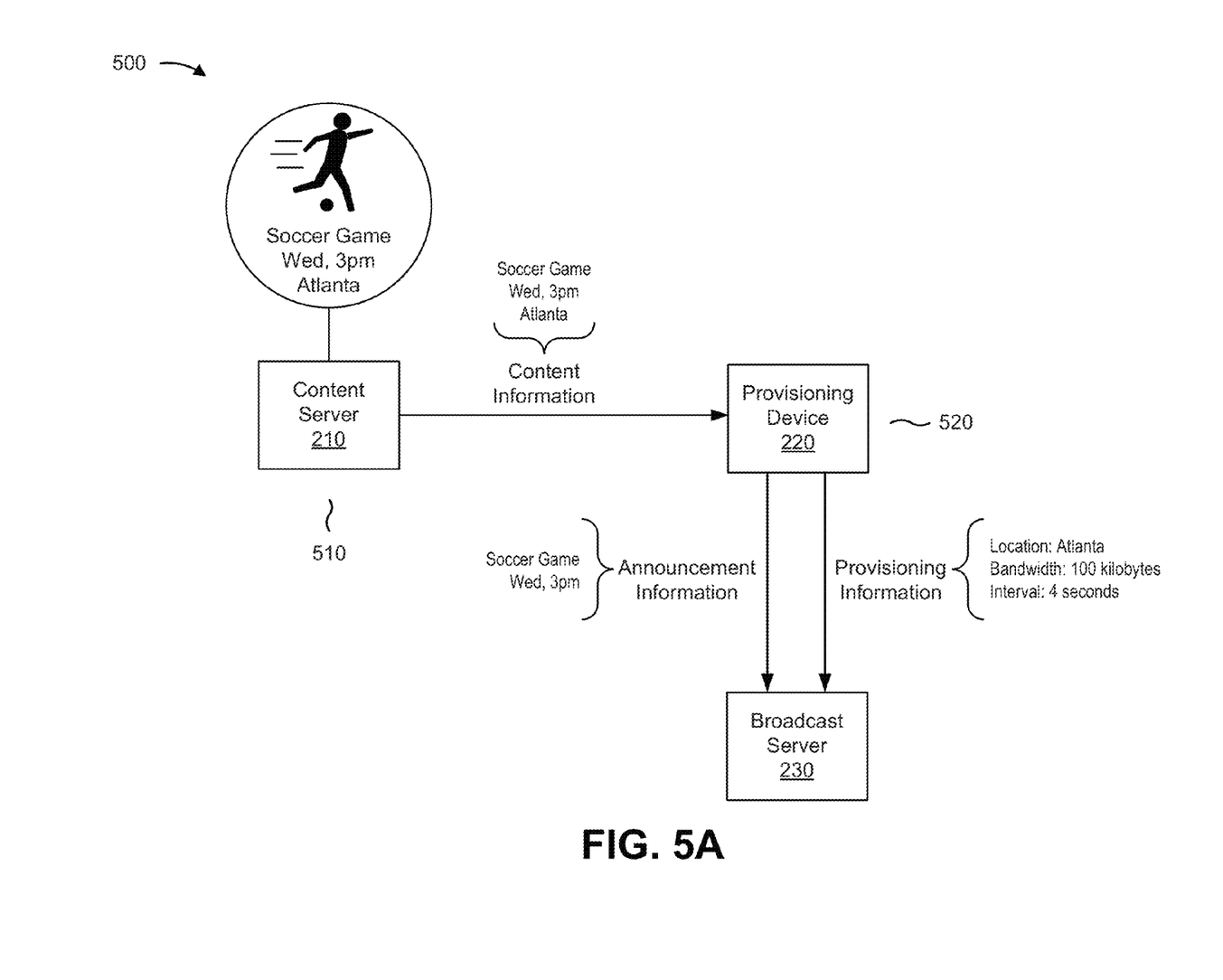
FIGS. 5A and 5B are diagrams of an example implementation relating to the example process shown in FIGS. 4A and 4B.
Figure 5B:
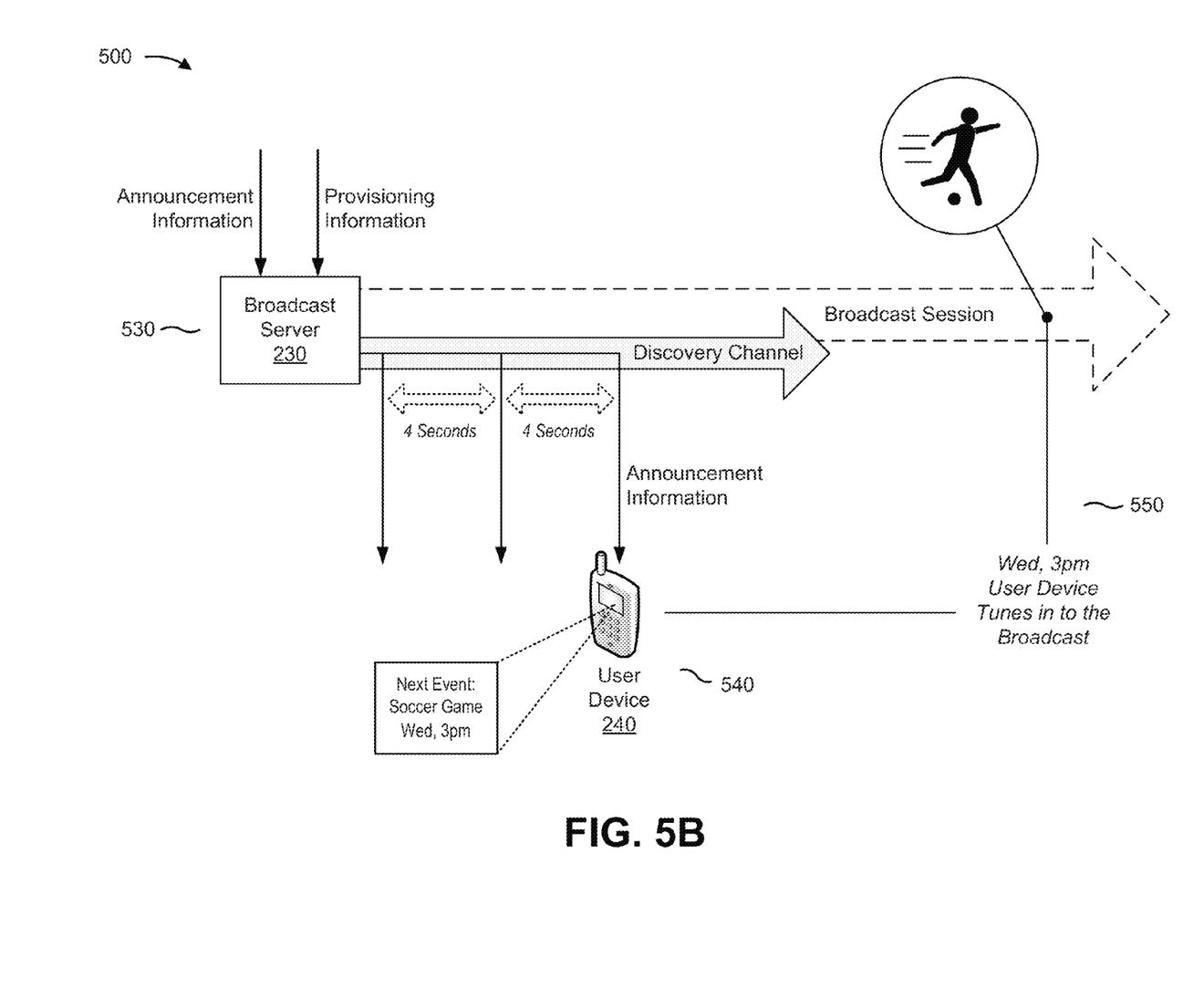

FIGS. 5A and 5B are diagrams of an example implementation 500 relating to process 400 shown in FIGS. 4A and 4B. In example implementation 500, provisioning device 220 may receive content information associated with an upcoming broadcast (e.g., a soccer game), and may provision a discovery channel to inform user device 240 about the broadcast. Using the announcement information, user device 240 may receive the broadcast.

As shown in FIG. 5A, and by reference number 510, provisioning device 220 may receive content information from content server 210. The content information may include information (e.g., a day and a time) associated with an upcoming broadcast (e.g., a soccer game). Additionally, the content information may include a geographic location (e.g., "Atlanta") to which the broadcast is to be provided.

As shown by reference number 520, provisioning device 220 may determine announcement information based on the content information. The announcement information may include the day and time (e.g., Wednesday at 3 pm) of the broadcast (e.g., the soccer game), as well as an IP address and TMGI associated with the broadcast. Additionally, provisioning device 220 may determine provisioning information describing how a discovery channel is to be provisioned. The provisioning information may include a discovery channel location (e.g., "Atlanta"), a discovery channel bandwidth (e.g., "100 kilobytes"), and an interval for providing the announcement information (e.g., "4 seconds"). Provisioning device 220 may send the announcement information and the provisioning information to broadcaster server 230.

As shown in FIG. 5B, and by reference number 530, broadcast server 230 may provision the discovery channel, based on the provisioning information (e.g., based on the location and bandwidth specified in the provisioning information). Broadcast server 230 may provide the announcement information, via the discovery channel, at regular intervals (e.g., every 4 seconds).

As shown by reference number 540, user device 240 (e.g., a smartphone) may receive the announcement information by tuning in to the discovery channel. User device 240 may tune in to the discovery channel for a period of time (e.g., 10 seconds) long enough to ensure receipt of the announcement information. User device 240 may disconnect from the discovery channel (e.g., a receiver associated with user device 240 may tune out, enter a low-power mode, etc.) to conserve battery power associated with user device 240. User device 240 may display information associated with the broadcast (e.g., a date, a time, etc.) on a user interface associated with user device 240.

As shown by reference number 550, broadcast server 230 may broadcast the soccer game at the appointed time (e.g., Wednesday at 3 pm). Using the announcement information (e.g., the IP address and TMGI associated with the broadcast), user device 240 may tune in to the broadcast. User device 240 may stream the soccer game (e.g., via a media player) on the user interface associated with user device 240.

As indicated above, FIGS. 5A and 5B are provided merely as an example. Other examples are possible and may differ from what was described with regard to FIGS. 5A and 5B.

Figure 6:
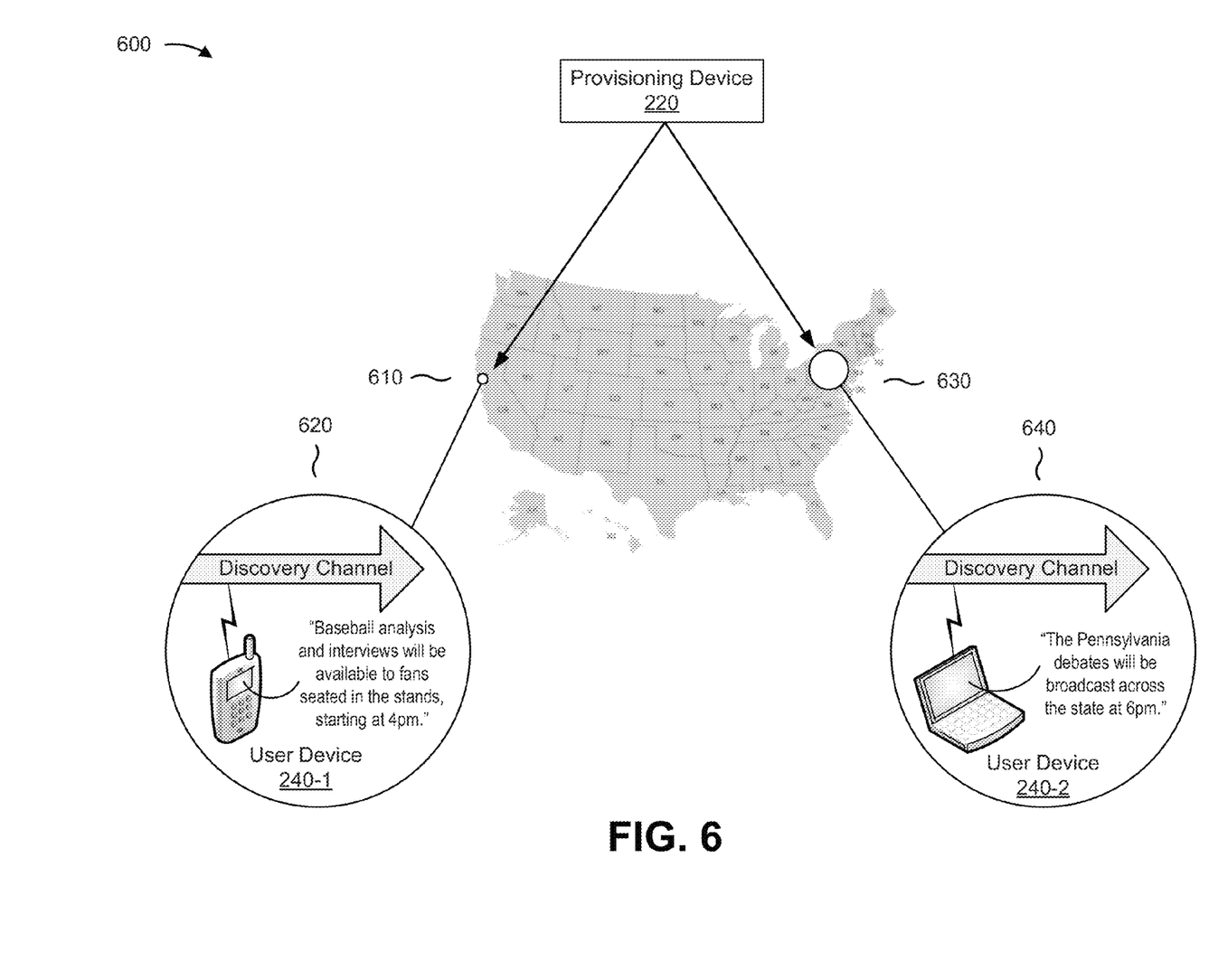
FIG. 6 is a diagram of another example implementation relating to the example process shown in FIGS. 4A and 4B.

FIG. 6 is a diagram of another example implementation 600 relating to process 400 shown in FIGS. 4A and 4B. In example implementation 600, provisioning device 220 may provide announcement information for broadcasts to different regions of a country.

As shown by reference number 610, provisioning device 220 may send announcement information via the discovery channel. The announcement information may include information about a first broadcast to a first geographic region (e.g., a portion of California) corresponding to a baseball stadium. The first broadcast may include analysis and interviews associated with a baseball game occurring in the baseball stadium. User device 240-1 may receive the announcement information, and may display a notification on a display associated with user device 240-1, as shown by reference number 620. At the time of the first broadcast (e.g., 4 pm), user device 240-1 may determine that user device 240-1 is within the first geographic region (e.g., the baseball stadium), and may display the first broadcast. Thus, a user of user device 240-1 may view the analysis and interviews while seated in the stands, in line at concessions, or the like.

As shown by reference number 630, the announcement information may include information about a second broadcast to a second geographic region corresponding to a state (e.g., Pennsylvania). The second broadcast may include a debate between two candidates for the office of state governor. User device 240-2 may receive the announcement information, and may display a notification on a display associated with user device 240-2, as shown by reference number 640. At the time of the second broadcast (e.g., 6 pm), user device 240-2 may determine that user device 240-2 is within the second geographic region (e.g., the state), and may display the second broadcast. Thus, a user of user device 240-2 may watch the debate.

As indicated above, FIG. 6 is provided merely as an example. Other examples are possible and may differ from what was described with regard to FIG. 6.

Figure 7:
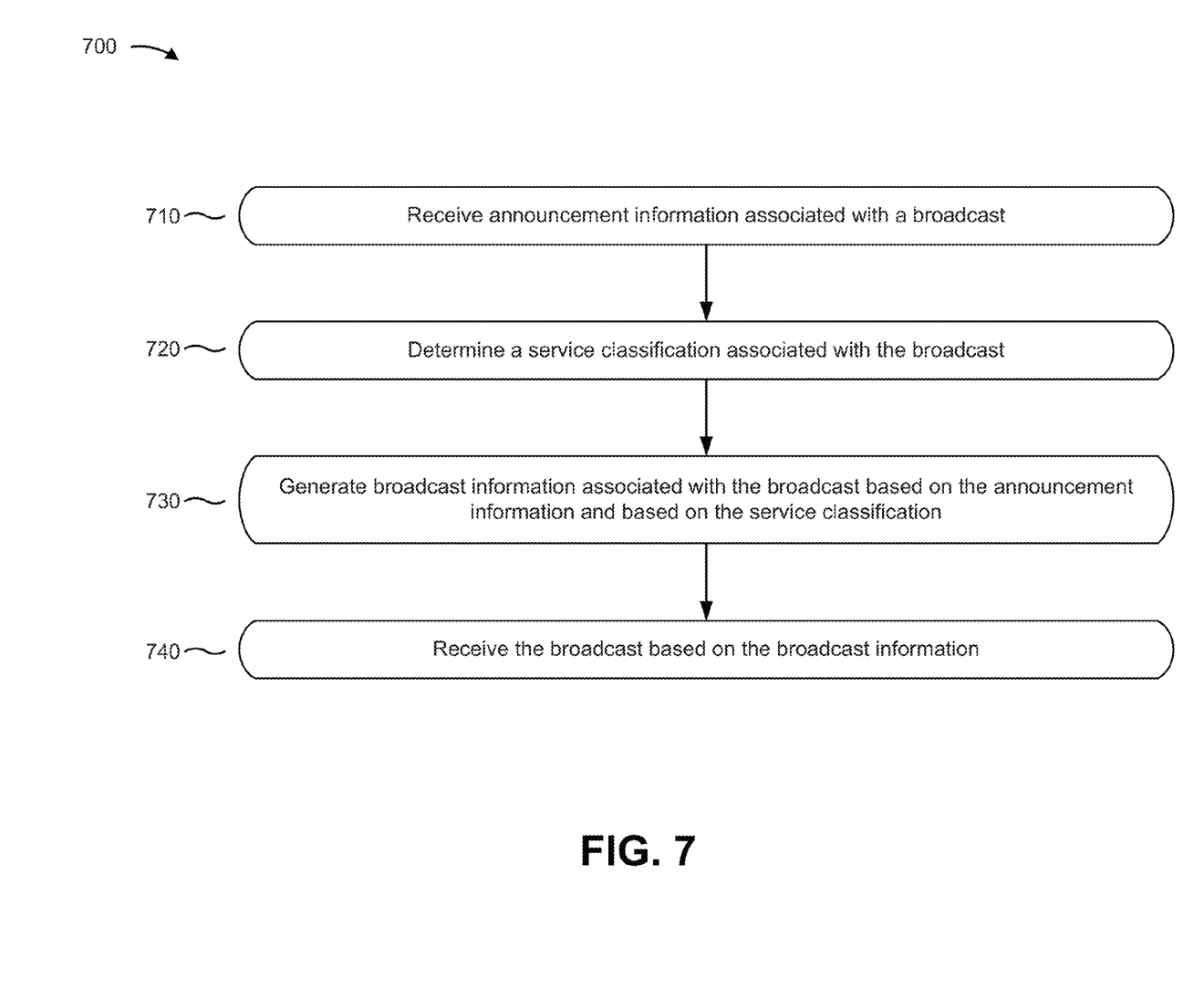
FIG. 7 is a flow chart of an example process for receiving a broadcast.

FIG. 7 is a flow chart of an example process 700 for receiving a broadcast. In some implementations, one or more process blocks of FIG. 7 may be performed by user device 240. Additionally, or alternatively, one or more process blocks of FIG. 7 may be performed by another device or a group of devices separate from or including user device 240, such as provisioning device 220 and/or broadcast server 230.

As shown in FIG. 7, process 700 may include receiving announcement information associated with a broadcast (block 710). For example, user device 240 may receive the announcement information from broadcast server 230 via the discovery channel.

In some implementations, user device 240 may receive the announcement information by use of software (e.g., middleware) that instructs a device capable of receiving and/or transmitting signals from a network (e.g., a wireless modem, a wireless broadband modem, a connect card, etc.) associated with user device 240 how to receive the announcement information via the discovery channel. For example, the software may cause user device 240 to tune in to the discovery channel and receive (e.g., download) the announcement information. In some implementations, the software may be pre-installed (e.g., stored in a data structure associated with user device 240) on user device 240 (e.g., by a manufacturer, a retailer, etc.). Additionally, or alternatively, user device 240 may complete an initialization process (e.g., a bootstrapping process) to receive the software to enable user device 240 to connect to the discovery channel. For example, user device 240 may receive the connection information (e.g., via a unicast call) from content server 210, provisioning device 220, and/or broadcast server 230. After completing the initialization process, user device 240 may be able to tune in to the discovery channel and receive the announcement information.

In some implementations, user device 240 may download the announcement information at regular intervals. For example, user device 240 may regularly (e.g., every fifteen minutes, every hour, etc.) tune to the discovery channel and receive announcement information. In this manner, user device 240 may receive updated announcement information (e.g., announcement information including additional and/or different information associated with upcoming broadcasts).

In some implementations, user device 240 may tune to the discovery channel for a threshold period of time (e.g., a minimum period of time, a maximum period of time, etc.) associated with each interval. For example, user device 240 may tune to the discovery channel for ten seconds every fifteen minutes. While tuned to the discovery channel, user device 240 may receive the announcement information. In some implementations, provisioning device 220 and/or broadcast server 230 may vary the bandwidth of the discovery channel to ensure that user device 240 may receive the announcement information (e.g., the entire announcement file) while tuned to the discovery channel. For example, provisioning device 220 and/or broadcast server 230 may increase the bandwidth of the discovery channel to ensure that a larger amount of announcement information may be downloaded within a threshold period of time (e.g., four seconds) shorter than the time that user device 240 may be tuned to the discovery channel (e.g., ten seconds).

As further shown in FIG. 7, process 700 may include determining a service classification associated with the broadcast (block 720). For example, user device 240 may determine the service classification (e.g., a type, a category, etc.) associated with the broadcast. For example, the service classification may include a category (e.g., football) that describes a broadcast (e.g., the Super Bowl). In some implementations, the service classification may be associated with an identifier (e.g., a service ID) that identifies the particular broadcast or class of broadcasts. The identifier may include one or more characters (e.g., numbers, letters, symbols, etc.). In some implementations, the service class may include a portion of metadata that makes an association between an application and a class of broadcasts.

In some implementations, the service classification may be associated with an application. For example, the application (e.g., a football application) may include a service ID that identifies a service classification (e.g., broadcasts associated with football). In some implementations, the application may be downloaded by user device 240. Additionally, or alternatively, the application may be installed on user device 240 by a manufacturer, a retailer, etc.

As further shown in FIG. 7, process 700 may include generating broadcast information associated with the broadcast based on the announcement information and based on the service classification (block 730). For example, user device 240 may use the service classification to examine the announcement information and generate broadcast information associated with the broadcast.

In some implementations, broadcast information may include a portion of announcement information relating to a particular broadcast and/or a particular class of broadcasts. For example, the broadcast information may include information associated with the particular broadcast, including a particular broadcast time, a particular broadcast location, a particular broadcast type, or the like. Additionally, or alternatively, the broadcast information may include information about how to receive the particular broadcast, such as an IP address, a TMGI, or the like.

In some implementations, user device 240 may identify broadcast information by parsing the announcement information. For example, user device 240 may be associated with an application (e.g., a football application) that includes an identifier (e.g., a service ID) associated with a service classification (e.g., football broadcasts). User device 240 may receive the announcement information, and may search the announcement information for one or more announcement identifiers that match the identifier (e.g., the service ID) associated with the service classification. In this manner, user device 240 may identify the broadcast information by searching the announcement information for broadcast information associated with a particular broadcast or class of broadcasts (e.g., by identifying a portion of the announcement information with the matching service ID). In some implementations, user device 240 may store the broadcast information (e.g., in a data structure associated with user device 240).

As further shown in FIG. 7, process 700 may include receiving the broadcast based on the broadcast information (block 740). For example, user device 240 may tune in to the broadcast provided by broadcast server 230 based on the broadcast information.

In some implementations, user device 240 may receive the broadcast based on a selection by a user of user device 240. For example, user device 240 may run the application and may display (e.g., via a user interface) a heading (e.g., a name, a description, a title, etc.) and/or an icon (e.g., an image, a picture, a symbol, a button, etc.) associated with the broadcast (e.g., associated with a service ID identifying the broadcast). The user may select the heading and/or icon (e.g., by touching the user interface). Based on the selection, user device 240 may cause (e.g., via software, middleware, etc.) a receiver (e.g., a wireless modem) associated with user device 240 to tune to the broadcast. The application may pull up a media player (e.g., a DASH player) that allows the user to view the particular broadcast.

While a series of blocks has been described with regard to FIG. 7, the blocks and/or the order of the blocks may be modified in some implementations. Additionally, or alternatively, non-dependent blocks may be performed in parallel. Further, one or more blocks may be omitted.

Figure 8:
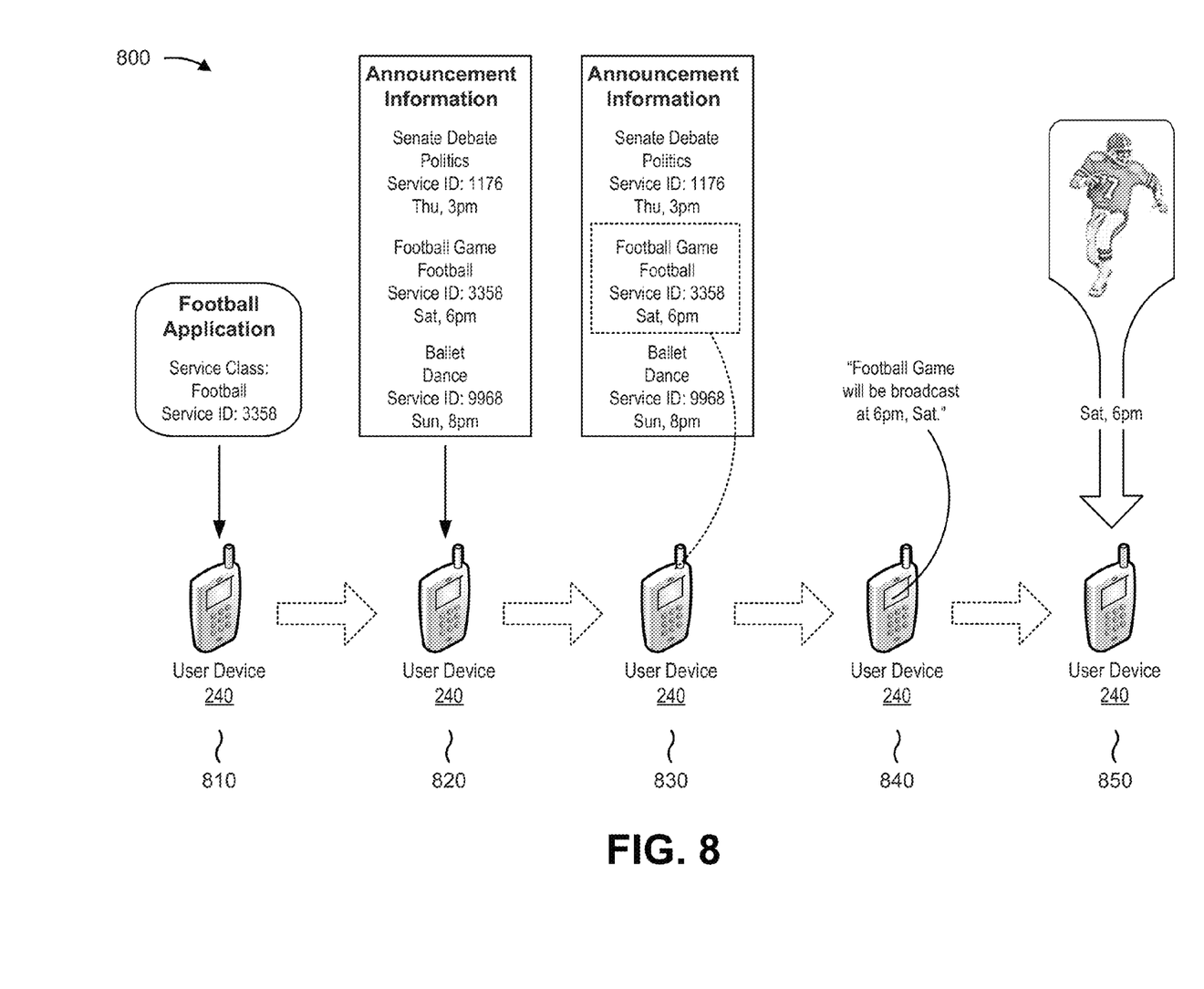
FIG. 8 is a diagram of an example implementation relating to the example process shown in FIG. 7.

FIG. 8 is a diagram of an example implementation 800 relating to process 700 shown in FIG. 7. In example implementation 800, user device 240 may receive announcement information identifying an upcoming broadcast of a football game, and may receive the broadcast of the football game based on the announcement information.

As shown by reference number 810, user device 240 may download an application for viewing football games (e.g., "Football Application"). The application may include a service classification (e.g., "Football") and a service ID (e.g., "3358") associated with the service classification. The application may also include information for connecting to the discovery channel.

As shown by reference number 820, user device 240 may tune in to the discovery channel (e.g., by using a receiver associated with user device 240 to connect to the discovery channel) and may download the announcement information. The announcement information may include information identifying several upcoming broadcasts (e.g., a Senate debate, a football game, and a ballet performance). For each of the upcoming broadcasts, the announcement information may include a service classification, a service ID, a day, and a time.

As shown by reference number 830, user device 240 may use the service ID (e.g., "3358"), specified by the application, to identify a particular broadcast (e.g., "Football Game")

associated with the service classification (e.g., "Football"). User device 240 may save this portion of the announcement information as broadcast information. User device 240 may display a portion of the broadcast information (e.g., such as the title, day, time, etc.) on a display associated with user device 240, as shown by reference number 840.

As shown by reference number 850, a user of user device 240 may open the application (e.g., the football application) to receive the particular broadcast (e.g., the football game) at the associated day and time (e.g., Saturday at 6 pm). User device 240 may use a media player to view the particular broadcast on a display associated with user device 240.

As indicated above, FIG. 8 is provided merely as an example. Other examples are possible and may differ from what was described with regard to FIG. 8.

Implementations described herein may allow a provisioning device to relieve network congestion by provisioning a discovery channel to deliver announcement information, to user devices, regarding future broadcasts.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
   one or more devices to:
   receive content information associated with a broadcast;
   determine announcement information based on the content information,
      the announcement information including information that allows a user device to receive the broadcast;
   determine provisioning information based on the announcement information,
      the provisioning information including information for provisioning a discovery channel, including:
         a bandwidth for the discovery channel,
         a geographic region associated with the discovery channel, and
         information specifying a time interval for providing the announcement information via the discovery channel;
   provision the discovery channel, by allocating the bandwidth for the discovery channel in the geographic region, based on the provisioning information; and
   provide the announcement information via the discovery channel based on the specified time interval.

2. The system of claim 1, where the one or more devices, when providing the announcement information, are further to:
   provide the announcement information at a first time; and
   provide the announcement information at a second time,
      the second time occurring at the specified time interval after the first time.

3. The system of claim 1, where the one or more devices, when determining the announcement information, are further to:
   determine an amount of announcement information; and
   where the one or more devices, when provisioning the discovery channel, are further to:
      provision the discovery channel based on the amount of announcement information.

4. The system of claim 1,
   where the geographic region is a broadcast location associated with the broadcast.

5. The system of claim 1, where the announcement information identifies at least one of:
   a time associated with the broadcast;
   a type associated with the broadcast;
   a multicast address associated with the broadcast; or
   an identifier associated with the broadcast.

6. The system of claim 1, where the provisioning information identifies at least one of:
   a range of frequencies associated with the discovery channel; or
   a broadcast time associated with the discovery channel.

7. The system of claim 1, where the broadcast comprises at least one of:
   a broadcast service, or
   a multicast service; and
   where the one or more devices are further to:
      provide information associated with the broadcast service or the multicast service via a multimedia broadcast multicast services transmission.

8. A non-transitory computer-readable medium storing instructions, the instructions comprising:

one or more instructions that, when executed by one or more processors, cause the one or more processors to:
determine announcement information associated with a broadcast,
the announcement information including information that allows a user device to receive the broadcast;
determine provisioning information based on the announcement information,
the provisioning information identifying:
an amount of bandwidth for provisioning a discovery channel,
a geographic region for which the discovery channel is to be provisioned, and
a time interval for providing the announcement information via the discovery channel;
provision the discovery channel for delivery of the announcement information based on the identified amount of bandwidth and the geographic region; and
provide the announcement information via the discovery channel based on the specified time interval.

9. The non-transitory computer-readable medium of claim 8, where the one or more instructions, that cause the one or more processors to provide the announcement information, further cause the one or more processors to:
provide the announcement information at a first time; and
provide the announcement information at a second time,
the second time occurring at the specified time interval after the first time.

10. The non-transitory computer-readable medium of claim 8, where the one or more instructions, that cause the one or more processors to determine the announcement information, further cause the one or more processors to:
determine an amount of announcement information; and
where the one or more instructions, that cause the one or more processors to provision the discovery channel, further cause the one or more processors to:
provision the discovery channel based on the amount of announcement information.

11. The non-transitory computer-readable medium of claim 8, where the geographic region identifies a broadcast location associated with the broadcast; and
where the one or more instructions, that cause the one or more processors to provision the discovery channel, further cause the one or more processors to:
provision the discovery channel based on the broadcast location.

12. The non-transitory computer-readable medium of claim 8, where the specified time interval is based on at least one of:
an amount of the announcement information;
a broadcast type; or
the geographic location.

13. The non-transitory computer-readable medium of claim 8, where the provisioning information identifies at least one of:
a range of frequencies associated with the discovery channel; or
a broadcast time associated with the discovery channel.

14. The non-transitory computer-readable medium of claim 8, where the announcement information includes at least one of:
first information associated with a multicast transmission, or
second information associated with a broadcast transmission; and
where the one or more instructions, that cause the one or more processors to provide the announcement information via the discovery channel, further cause the one or more processors to:
provide the first information or the second information via the discovery channel.

15. A method, comprising:
determining, by one or more devices, announcement information associated with a plurality of broadcasts,
the announcement information including information that allows a user device to receive the plurality of broadcasts;
determining, by the one or more devices, a time interval for providing the announcement information;
determining, by the one or more devices, provisioning information based on the announcement information,
the provisioning information including:
information that identifies a bandwidth to be allocated for a discovery channel to deliver the announcement information,
information that identifies a geographic region for which the discovery channel is to be provisioned, and
information identifying the time interval;
provisioning, by the one or more devices, the discovery channel based on the bandwidth and the geographic region;
providing, by the one or more devices, the announcement information via the discovery channel at a first time; and
providing, by the one or more devices, the announcement information via the discovery channel at a second time,
the second time being based on the time interval and the first time.

16. The method of claim 15, where determining the announcement information further comprises:
determining an amount of announcement information; and
where provisioning the discovery channel further comprises:
provisioning the discovery channel based on the amount of announcement information.

17. The method of claim 15, where the geographic region is a broadcast location associated with the plurality of broadcasts.

18. The method of claim 15, where the announcement information identifies at least one of:
a time associated with a broadcast of the plurality of broadcasts;
a type associated with the broadcast; or
an identifier associated with the broadcast.

19. The method of claim 15, where the provisioning information identifies at least one of:
a range of frequencies associated with the discovery channel; or
a broadcast time associated with the discovery channel.

20. The method of claim 15, where a broadcast, of the plurality of broadcasts, comprises a broadcast service or a multicast service to be provided via a multimedia broadcast multicast services network.

* * * * *